UNITED STATES PATENT OFFICE.

BERTRAND B. GRUNWALD, OF REDWOOD CITY, CALIFORNIA, ASSIGNOR TO NATIONAL MAGNESIA MANUFACTURING COMPANY, A CORPORATION OF CALIFORNIA.

PROCESS OF MANUFACTURING MAGNESIUM CARBONATE.

1,285,683.     Specification of Letters Patent.     Patented Nov. 26, 1918.

No Drawing.     Application filed May 20, 1916. Serial No. 98,860.

*To all whom it may concern:*

Be it known that I, BERTRAND B. GRUNWALD, a subject of the Emperor of Austria, and a resident of Redwood City, San Mateo county, State of California, have invented a certain new and useful Process of Manufacturing Magnesium Carbonate, of which the following is a specification.

The invention relates to a process of manufacturing magnesium carbonate and particularly light magnesium carbonate such as is used for heat insulation purposes.

An object of the invention is to provide a process of making light magnesium carbonate from magnesite.

The invention possesses other advantageous features, some of which, with the foregoing, will be set forth at length in the following description, where I shall outline in full one method of practising the process of my invention, but it is to be understood that other methods may be employed without departing from the spirit of my invention as expressed in the appended claims.

Heretofore, as far as I am aware, all magnesium carbonate used in the manufacture of magnesia covering for heat insulation purposes has been made from dolomite. Magnesium carbonate obtained from magnesite under the methods heretofore known and practised is heavier than the magnesium carbonate obtained from dolomite and therefore is less suitable than the lighter carbonate for heat insulation. In accordance with my process I produce a magnesium carbonate from magnesite which is not heavier than the carbonate obtained from dolomite.

In the process of producing magnesium carbonate from magnesite, the calcined magnesite always contains more or less dead burned particles which do not react with water or with carbonic acid gas, and in the prior process these particles have entered into the final product in unchanged form, thereby increasing the weight thereof. Further, the magnesium carbonate resulting through the precipitation by heat of a clear magnesium bicarbonate solution, as practised in the dolomite process, is more voluminous than the magnesium carbonate obtained through precipitation of a watery mixture of magnesium bicarbonate and magnesium oxid as heretofore practised in the magnesite process.

The process of my invention eliminates to a great extent the first cause of greater weight by eliminating the dead burned particles from the finished product and while it does not remove the second cause, a new step introduced in my process makes the final product more voluminous.

In accordance with my process, I calcine magnesite in a suitable kiln and recover the kiln gas. Then the calcined magnesite is finely ground and treated with water in a suitable apparatus for the purpose of hydrating the magnesia and at the same time of separating the unhydrated or dead burned particles therefrom by sedimentation. The hydrated magnesia, freed of the heavy impurities, is then charged into suitable tanks or receptacles and subjected to the action of carbonic acid gas or washed and cooled kiln gas, to obtain the bicarbonate solution. After sufficient carbonation has taken place, the watery mixture of magnesium bicarbonate is heated to precipitate magnesium carbonate. After precipitation, the mixture is passed through a filter to separate the water from the magnesium carbonate. When sufficient water has been removed to give the carbonate a thick mushy consistency, this freshly precipitated carbonate is charged into a suitable apparatus and subjected to the action of carbonic acid gas, kiln gas or air containing over 6% of carbonic acid gas, for recarbonation. This recarbonation causes the incorporation in the mixture of carbonic acid gas and at the same time, the formation of magnesium bicarbonate solution. After sufficient recarbonation the mixture is ready for drying and is charged into suitable molds or receptacles for that purpose. During the process of drying, the magnesium bicarbonate formed by the recarbonation step, decomposes into magnesium carbonate and carbonic acid gas, the gas causing the carbonate to become porous and voluminous. The gas either escapes or is retained within the solid carbonate producing voids therein.

I claim:

1. The process of manufacturing light magnesium carbonate from light calcined magnesite containing dead burned magnesite, which includes separating the dead burned magnesite from the light calcined magnesite by treatment with and sedimentation in water.

2. The process of manufacturing light magnesium carbonate from magnesite, which consists in calcining the magnesite, whereby some dead burned magnesite is formed, treating the calcined magnesite with water whereby magnesium hydroxid is formed, separating the dead burned magnesite from the mass, subjecting the magnesium hydroxid to the action of carbonic acid gas whereby magnesium bicarbonate is formed, and heating the bicarbonate to precipitate magnesium carbonate.

3. The process of manufacturing light magnesium carbonate which includes subjecting freshly precipitated magnesium carbonate to the action of carbonic acid gas and then drying the material.

4. The process of manufacturing light magnesium carbonate from magnesite which consists in calcining the magnesite, treating the calcined magnesite with water to form magnesium hydroxid, subjecting the hydroxid to the action of carbonic acid gas, whereby magnesium bicarbonate is formed, heating the bicarbonate to precipitate magnesium carbonate, subjecting the freshly precipitated carbonate to the action of a gas containing not less than 6% carbonic acid gas and drying the material.

In testimony whereof I have hereunto set my hand at San Francisco, California, this 1st day of May, 1916.

BERTRAND B. GRUNWALD.

In presence of—
H. G. Prost.